United States Patent Office 3,338,551
Patented Aug. 29, 1967

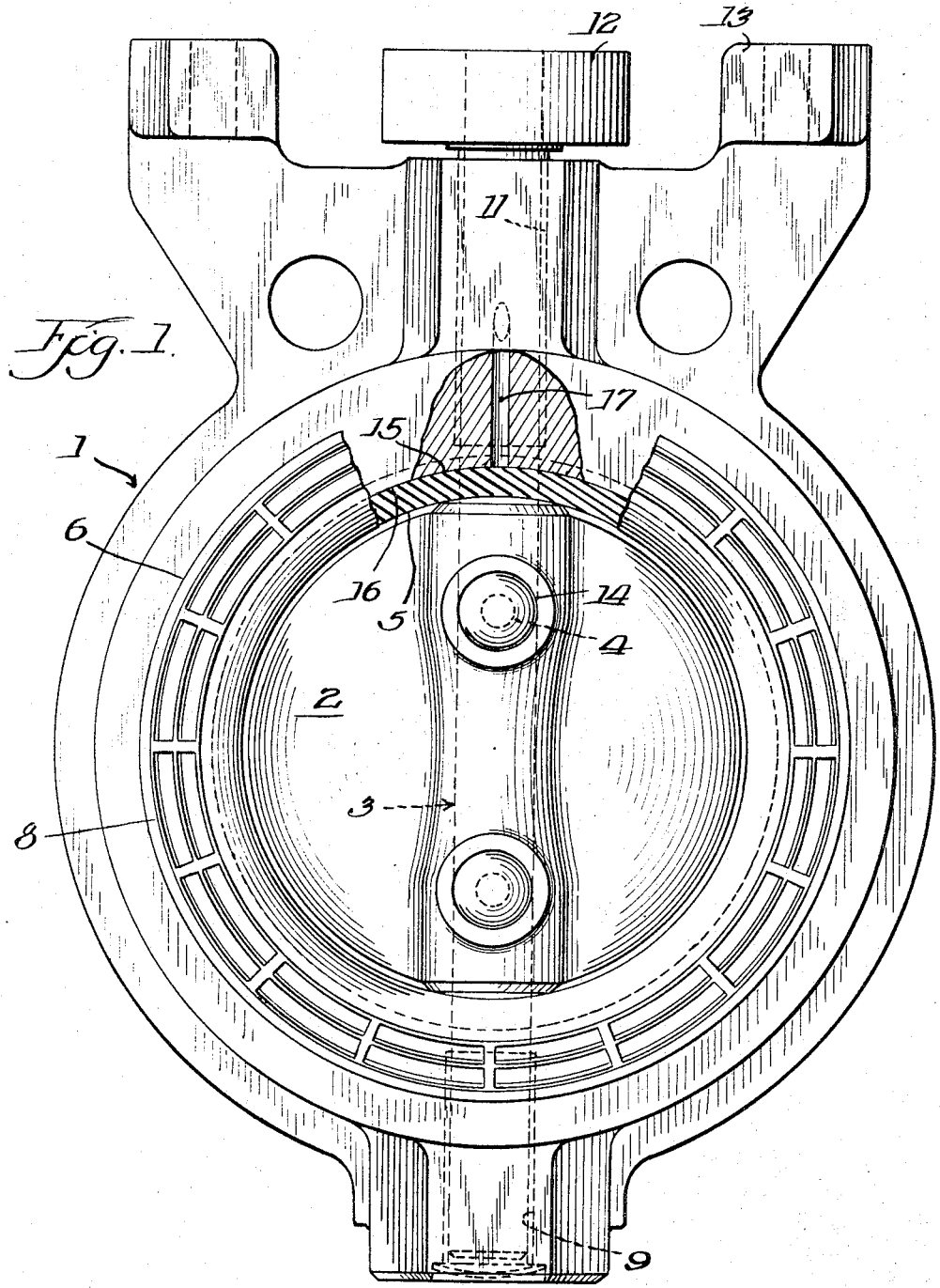

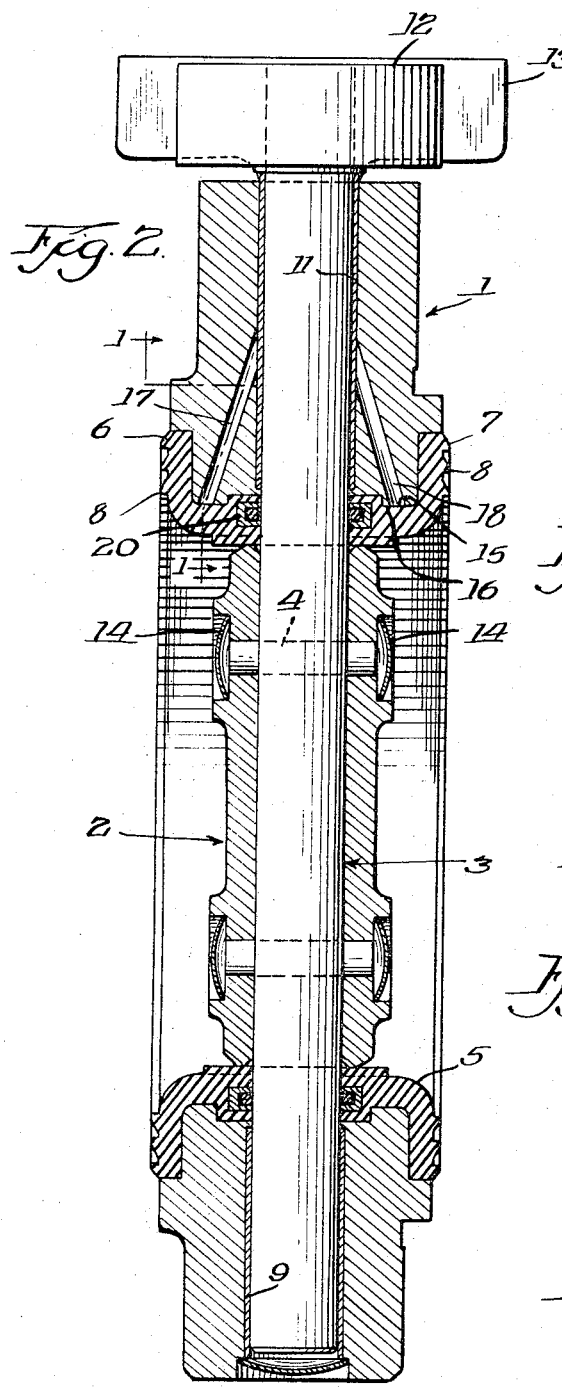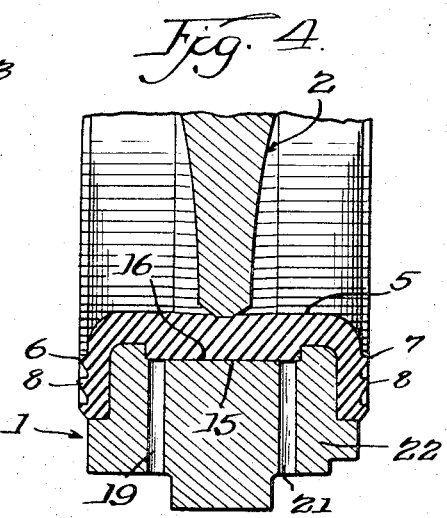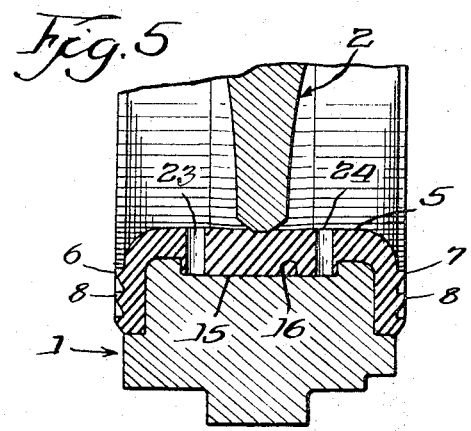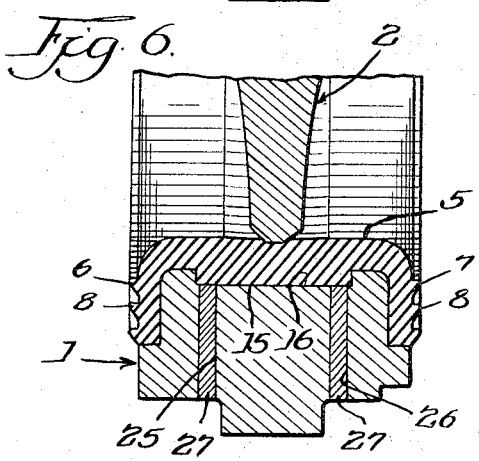

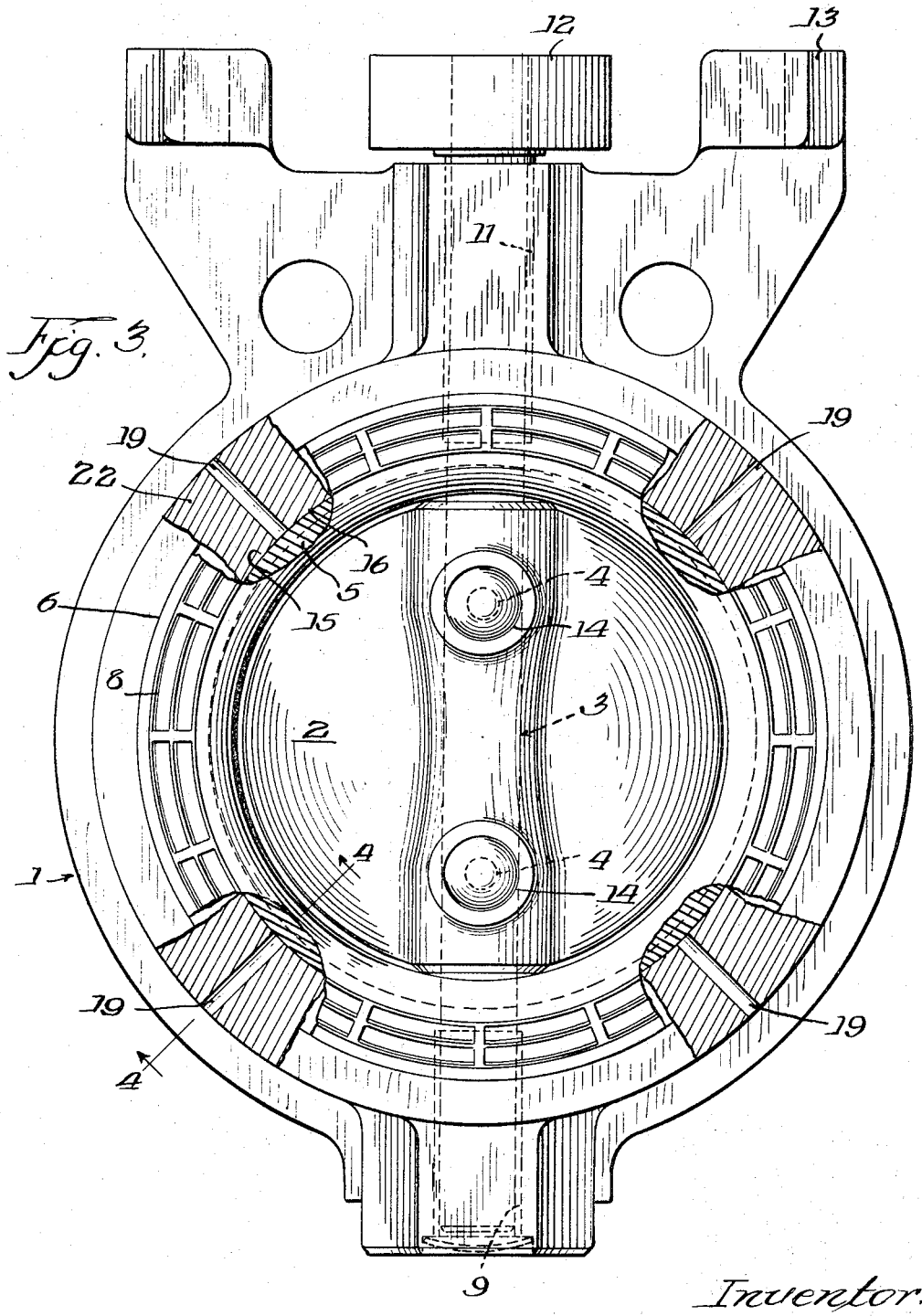

3,338,551
VENTED SEAT LINER FOR
BUTTERFLY VALVE
David L. Black, Downers Grove, Ill., assignor to Crane
Co., Chicago, Ill., a corporation of Illinois
Filed Dec. 7, 1964, Ser. No. 416,305
5 Claims. (Cl. 251—306)

This invention relates broadly to a butterfly valve and more particularly it is concerned with a novel type of elastomer or rubber-like seat for said valves especially adapted for unusual and more severe services.

In order to have a better appreciation of the conditions referred to in the preceding paragraph, it should be understood that certain installations in the field require that butterfly valves be made suitable for exposure to higher temperatures and pressures. Specifically, for example, the U.S. Navy has established a requirement for valves of this type intended for use aboard ship embodying a more severe specification and test requirements. This specification, MIL–V–22133–B (Ships) March 20, 1961, requires for one of the tests, heat exposure in an oven so that valve flange metal temperature will rise to 400° F. in less than thirty minutes. The temperature is then maintained in the 400–500° F. range for thirty minutes. Water pressure at 100 pounds per square inch is maintained in the valve assembly during the entire heat exposure. These tests are made to insure the ability of the valve and the elastomer seat ring to withstand severe heat for a relatively short time such as might occur during an outbreak of fire aboard ship. Obviously, this test requirement, among others, makes demands upon a butterfly valve, say, in excess of the normal service encountered in the field. It will be realized that if the normal valve seat of a butterfly valve were subjected to the temperatures referred to, the valve seat or liner would be caused to eventually break down, resulting in valve failure.

It has been found from experimentation that said valve failure has been attributed to a build-up of gas pressures around peripheral portions of the seat liner which normally contact an annular recess in the valve body. Specifically, this failure occurs in the seat liner at the location described due to the fact that gas pressure develops from the volatile plasticizer in the rubber compound materials that may be present in said body recess and in the rubber seat liner when subjected to higher temperatures. Said accumulation of pressure causes the inward bulging radially of the seat and damage to the valve seat. The latter condition affects proper functioning of the valve closure member and seat tightness.

It has been discovered in the solution of this problem that four convenient methods prevent said build-up of pressure by suitably venting these gases.

Such venting methods provide:

(1) Inclined passageways or holes to connect the annular space to be vented with stem bearing above the stem seal;

(2) Radial passageways or holes through the body wall adjacent the seat to vent to atmosphere;

(3) Passageways or radially extending holes through the elastomer or rubber seat to prevent any pressure differential tending to collapse said seat; and (4) Radial passageways or holes through body wall adjacent to the seat in the same manner as (2) above, but filling said holes with low temperature melting metal or other suitable material which upon predetermined melting releases accumulated pressures.

The design of this construction is such that in no case will the above methods be detrimental to the performance of the valve.

It is therefore one of the more important objects of the invention to provide a convenient and economical means for design and construction of vents cooperating with a rubber or elastomer seat and capable of withstanding successfully the high temperature and pressure conditions above referred to.

In summary, it will be apparent that a principal object of this invention is to provide a venting means by which the failure and/or distortion of the seat ring or liner is overcome.

Other objects and advantages will become more readily apparent upon proceeding with the following description read in light of the accompanying drawings, in which:

FIG. 1 is a preferred embodiment of the invention showing a front assembly view of a butterfly valve in partial section embodying the invention, the fragmentary sectional portion being taken on the line 1—1 of FIG. 2;

FIG. 2 is a transverse sectional assembly view of the construction shown in FIG. 1;

FIG. 3 is a front assembly view in fragmentary section showing a modified form of the invention;

FIG. 4 is a fragmentary sectional view taken on the line 4—4 of FIG. 3; and

FIGS. 5 and 6 are fragmentary sectional views of further modifications of the invention.

Similar reference numerals refer to similar parts throughout the several views.

Referring now to FIGS. 1 and 2, the butterfly valve illustrated is of the general configuration shown in U.S. patent application Ser. No. 177,402, filed Mar. 5, 1962, now Patent No. 3,173,650, modified to more clearly illustrate the application of this invention. Thus, the valve casing generally designated 1 is fitted with the rotatably mounted closure member generally designated 2, non-rotatably journalled to the shaft or stem generally designated 3 by means of the pins 4, the said closure member cooperating with the rubber or other suitable elastomer seat or liner 5 to effect seat tightness by providing an intereference fit. As shown in FIG. 2, and also in FIGS. 4 to 6 inclusive the said seat or liner is of flanged form by means of the side disposed annular extensions 6 and 7, each of which is preferably provided with the serrations 8 for effecting a fluid tight seal with supporting pipe flanges for connection to a pipeline (not shown).

The valve shaft or stem 3 is journalled within the casing in lower and upper planes as at 9 and 11, respectively. The valve is operated either by manual means or suitable electric or hydraulic operation, none of which is shown, and is done by suitable attachment by the coupling member 12 and the supporting flanges 13.

Preferably, although not necessarily, the pins 4 may be shielded by Welch plugs 14 shown and described in more detail in said patent application. As indicated, the stem journals at 9 and 11 may be accomplished by suitable low friction bearing inserts as shown in order to provide improved bearings for the stem.

It will, of course, be understood that the invention has broad application to include the replaceable liner as well as molded-in type of seat rings or liners.

As previously stated, when valves of this type are subjected to the excessive pressure-temperature combinations referred to, the said seats or liners due to the gases developed from said volatile material embodied in the manufacture of rubber or elastomer or because of entrapped water becoming steam and accumulating between the annular surfaces 15 of the seat 5 and the annular surface 16 of the casing 1 will cause a pressure build-up between said liner and said body or casing to distort the seat. Clearly, such distortion of the seat insert will seriously affect the efficiency of the valve performance in maintaining fluid tightness and result in failure of the valve by rupture of elastomer. Such failures ultimately necessitate expensive shut-downs of pipe lines for replacement of the seat insert. It has been discovered that if the areas provided by the respective surfaces 15 and 16 can be conveniently vented, the difficulties referred to can be successfully overcome and this solution constitutes the essence of this invention.

Attention is now directed again to the preferred form of such construction in FIGS. 1 and 2 in which the inclined or angularly disposed passageways, apertures, or holes 17 and 18, as shown more clearly in FIG. 2, are provided to connect the area between the surfaces 15 and 16 so as to be vented outwardly to atmosphere through the stem bearing hole defined by the surface 11 for the journaled support of the shaft 3. Fluid leakage to atmosphere is suitably prevented by means of the seal member generally designated 20 shown more clearly in FIG. 2. The upper end portion of the holes 17 and 18 communicate directly with the stem bearing 11 as more clearly shown in FIG. 1.

Thus, it will be apparent that with the construction just described, venting to atmosphere occurs by passage of the trapped gases normally existing between the surfaces 15 and 16 during severe service to escape to atmosphere passing along the outer peripheral surface of the shaft 3 and the bore 11 journalling said shaft. While the description of the venting means has been directed to a construction employing only such vents at the upper portion of the stem bearing as at 11, it will of course be understood that where service conditions required similar venting means may be provided at the stem bearing 9, in which case the Welch plugs indicated will be removed to permit such venting to atmosphere.

Referring now to the modified form in FIGS. 3 and 4, the venting means is in principle identical to that described in connection with FIG. 1, except that venting holes 19 and 21 are drilled radially through the body wall designated 22 to communicate with the space between the annular surfaces 15 and 16 as in the case of FIGS. 1 and 2. It will be understood that while a plurality of radially extending holes at 19 and 21 are indicated as being on the upstream and downstream sides of the valve as shown more clearly in FIG. 4, this is done in order to assure that the venting is adequate and adapt the valve more flexibly to its positioning in the pipe line. In this connection, for example, the outward radial flexing of the seat by the closure member 2 against the inner ported surface of the seat 5 will cause a fluid tight seal to be effected between the surfaces 15 and 16 opposite the point where said peripheral portion of the closure member 2 makes said seat contact with the insert 5. Thus, in such case, venting of the accumulating gases between the surfaces 15 and 16 is positively assured. Depending upon the installation encountered, the positioning of the radially extending holes 19 and 21 and the number and size of such relief apertures employed will vary with the size of the valve and the conditions in the field.

FIG. 5 shows a fragmentary view of a modification in which vent holes are drilled transversely only through the rubber liner 5 to prevent any pressure differential tending to collapse the said liner inwardly. It will be appreciated that this modified construction is employed in such cases in which it is inconvenient or impractical to provide said venting in the casing or body as previously described. Further, it is done in such installation where venting of gases within the pipeline itself will not be objectionable. It should be realized of course that the interference fit normally provided by the closure member 2 with the seat liner 5 as shown prevents any leakage from the upstream portion to the downstream portion of the valve through the vent holes 23 and 24 because clearances between surfaces 15 and 16 are closed off by said fit.

Directing attention to FIG. 6, a further modification of the invention is shown from the construction in FIGS. 3 and 4. Here, the holes 25 and 26 are filled with a low temperature melting material 27 to maintain aesthetic appearance. Said material 27 will predeterminately melt out to release any gas pressure that may develop between surfaces 15 and 16 when the valve is subject to excessive temperature.

It will be appreciated that only a few preferred forms have been illustrated and described. However, it will be apparent the invention is capable of embodiment in other modifications falling within the spirit of the claims as hereinafter set forth.

I claim:
1. A butterfly valve including:
   (1) a casing;
   (2) a closure member revolvably mounted in said casing;
   (3) a resilient seat within the casing cooperating with said closure member in an interference fit therebetween to effect fluid tightness at predetermined position of said closure member; and
   (4) aperture means transversely extending through said seat at substantially equidistant intervals around the periphery thereof, said means thereby preventing distortion of said seat when the same is subjected to abnormally high temperatures.
2. A butterfly valve as defined in claim 1 wherein said aperture means are positioned on each side of said closure member when said member is in a predetermined position.
3. A butterfly valve including:
   (1) a casing;
   (2) a stem positioned in said casing, said casing having bearing holes therein;
   (3) a closure member affixed to said stem and revolvably mounted in said casing;
   (4) a resilient seat within said casing surrounding and cooperating with said closure member in an interference fit therebetween to effect fluid tightness when said closure member is in the closed position; and
   (5) venting means comprising radially extending passageways in said casing cooperating with the outer periphery of said seat at substantially equidistant intervals around the periphery thereof, said venting means positioned on each side of said closure member when said member is in said closed position.
4. The subject matter of claim 3, the said passageways being substantially filled with a low temperature melting material to thereby release any fluid pressures to atmosphere upon melting of said material.
5. A butterfly valve including:
   (1) a casing;
   (2) a stem positioned in said casing, said casing having bearing holes therein;
   (3) a closure member affixed to said stem and revolvably mounted in said casing;
   (4) a resilient seat within said casing surrounding and cooperating with said closure member in an interference fit therebetween to effect fluid tightness at predetermined position of said closure member; and
   (5) venting means communicating between an outer peripheral portion of said seat and said bearing holes, said means preventing distorting of said seat when the same is subjected to abnormally high temperature by allowing fluid trapped between said casing and said seat to vent through said bearing holes.

References Cited

UNITED STATES PATENTS

| 3,076,631 | 2/1963 | Grove | 251—173 |
| 3,138,406 | 6/1964 | Chamberlain | 137—72 X |
| 3,144,035 | 8/1964 | Hablanian | 137—1 |

FOREIGN PATENTS

| 949,442 | 2/1964 | Great Britain. |

M. CARY NELSON, *Primary Examiner.*

R. C. MILLER, *Assistant Examiner.*